(No Model.) 2 Sheets—Sheet 1.
D. CORNELIUS.
STUMP EXTRACTOR.
No. 247,017. Patented Sept. 13, 1881.
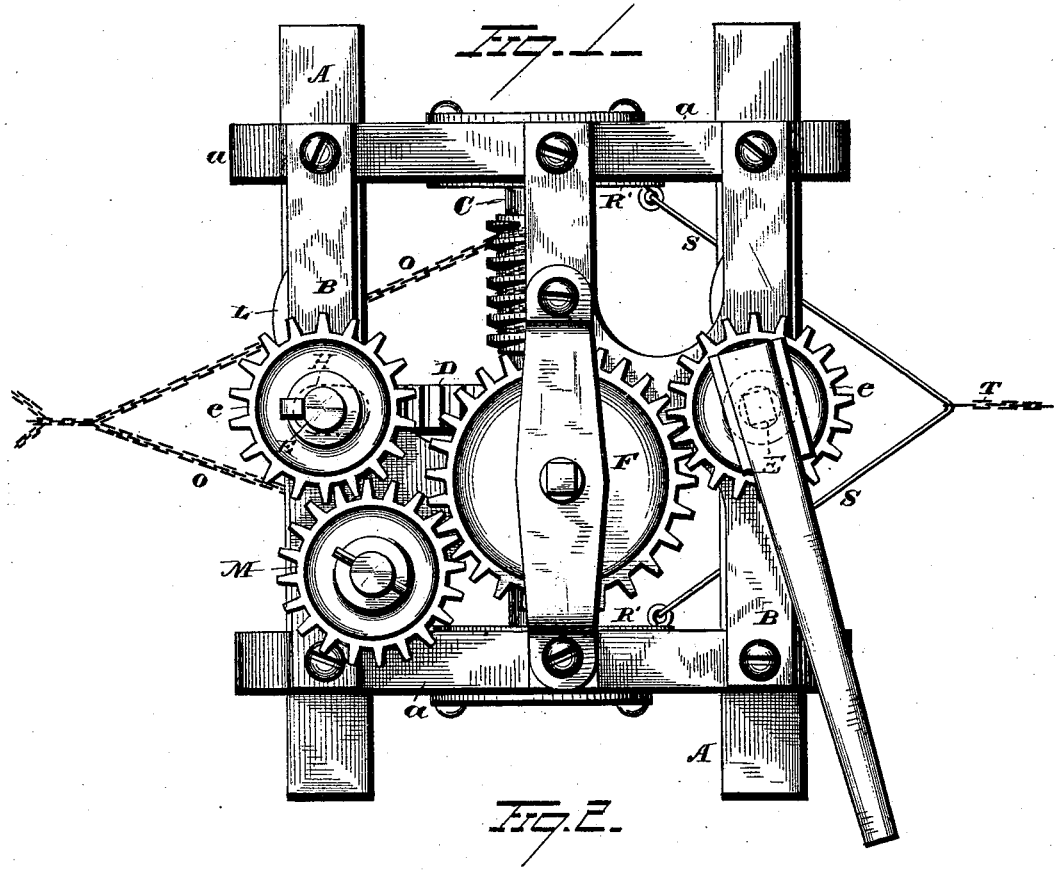
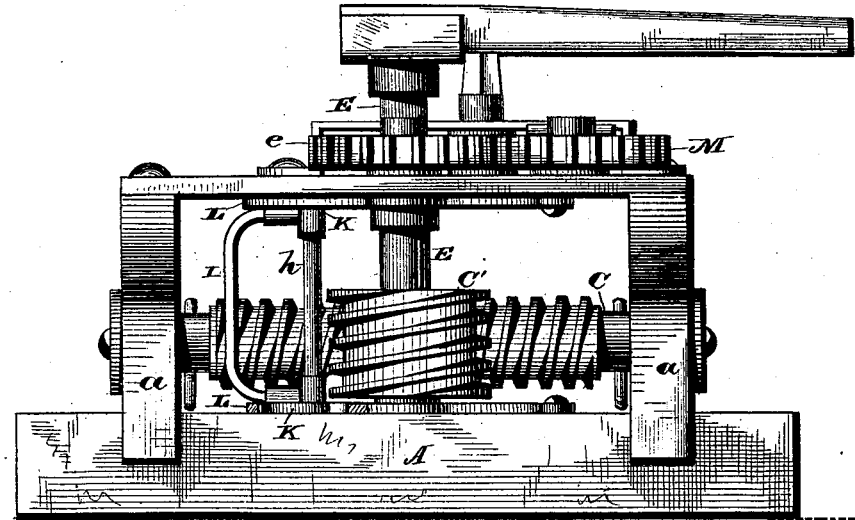
WITNESSES
Wm. McArthur
Wm. R. Keyworth
INVENTOR
Daniel Cornelius
per T. L. Alexander
ATTORNEY

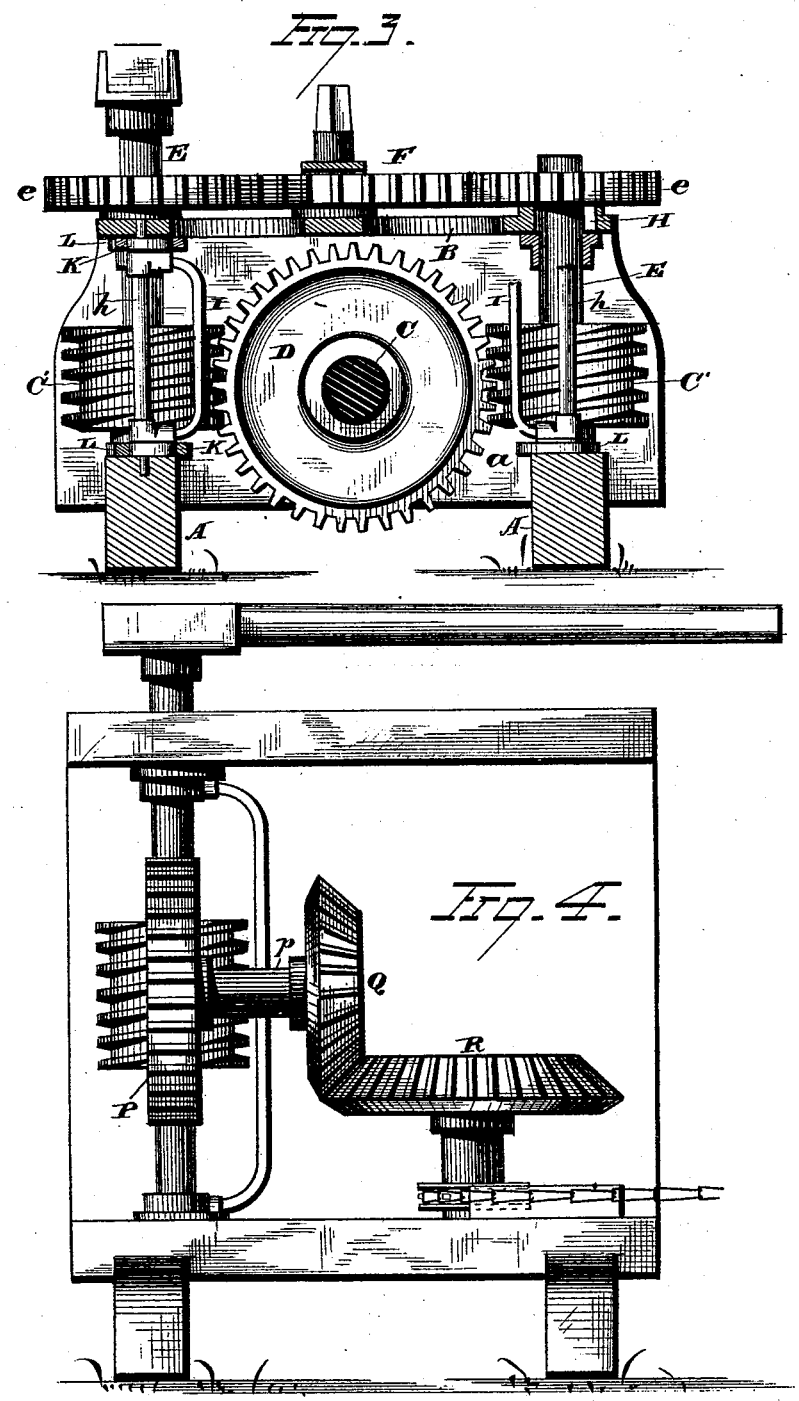

UNITED STATES PATENT OFFICE.

DANIEL CORNELIUS, OF JEFFERSON CITY, MISSOURI, ASSIGNOR TO HIMSELF AND M. L. KORS, OF BEARDSTOWN, ILLINOIS.

STUMP-EXTRACTOR.

SPECIFICATION forming part of Letters Patent No. 247,017, dated September 13, 1881.

Application filed August 16, 1881. (No model.)

*To all whom it may concern:*

Be it known that I, DANIEL CORNELIUS, of Jefferson City, in the county of Cole and State of Missouri, have invented certain new and useful Improvements in Stump-Extractors; and I do hereby declare that the following is a full, clear, and exact description thereof, reference being had to the accompanying drawings, and to the letters of reference marked thereon, which form part of this specification.

This invention relates to that class of devices known as stump "pullers" or "extractors."

The object of my improvement is to save the trouble of unwinding a chain by reversing the movement of the whole apparatus. This object I attain by means of the mechanism shown in the accompanying drawings, in which—

Figure 1 is a top or plan view. Fig. 2 is a side elevation. Fig. 3 is a section. Fig. 4 represents a modification.

The main frame of my machine is composed of the two base-bars A and the two side ends, a. These latter ends are connected together by means of the metal bars B. C represents the main shaft, which is journaled in the side ends of the machine, and to which my chains are connected. This shaft is provided with a large gear-wheel, D, which meshes with the two worm-gears C' upon the vertical shafts E. These shafts have upon their upper ends the gear-wheels e, which intermesh with the large driving-gear F. The shaft of this large driving-wheel is square at its upper end, so as to receive a handle for turning it. The shaft of one of these upper wheels is also squared, so that the power can be applied to either wheel. These two small upper side wheels are arranged to be engaged or disengaged from the main large driving-wheel. This arrangement is effected as follows: In both of the upper metallic bars is formed a slot, H, through which the shafts of these wheels pass; also, the vertical rods h are provided, which have their bearings in the upper metal bars and in the lower base-bars of the frame. On each bar is pivoted a swinging bail, I, having at their upper and lower ends the eccentrics K, the said eccentrics working in pivoted frames L. Now, by turning these bails in one direction, those pivoted plates through which the shafts of these worm-gears pass will be swung out from the large gear-wheel, so as to disengage the worm-gears therefrom. In this way after a stump has been extracted, after the chains O have been wound upon the main shaft, by swinging these bails and disengaging the worm from the main driving-gear the operator can, by simply drawing upon the chain, unwind it from the main shaft without the necessity of reversing the movement of the whole apparatus.

M represents an intermediate gear, which may be arranged to intermesh with the large gear-wheel upon the top of the frame, and also with one of the smaller side gears, although in practice this may be dispensed with and the large top gear be intermeshed directly with the small gear.

In the modification shown in Fig. 4 I have changed the arrangement of the apparatus somewhat, still preserving the principles of my invention. In this case the shaft to which the chains are attached is vertical. The worm-gear intermeshes with a gear, P, upon a shaft, p, upon which is a beveled gear, Q. This engages with a beveled gear, R, upon the shaft to which the chains are attached.

In order to anchor this machine I provide the boxes R', to which the chains S are attached. These two chains meet at a point back of the machine and are connected to a single chain, T, which can be carried back and attached to a stump or tree in any part of the field. This chain will be of such a length as to admit of the machine being carried around in a circuit of at least several hundred yards.

The device thus constructed will be found to be exceedingly simple, strong, and durable, and will avoid the necessity of reversing the movement of the entire apparatus when it becomes necessary to unwind the chain from the main shaft in order to lengthen it out to engage on other stumps to be extracted from the ground.

Having thus described my invention, what I claim, and desire to secure by Letters Patent, is—

1. The combination, in a stump-extractor, of the shaft upon which the chain is wound, with mechanism adapted to be disengaged from the driving-shaft, so that after the chain has been wound upon the side shaft the driving-bar can be disengaged from the shaft and the chain unwound without a reversal of the movement of the whole apparatus, substantially as described.

2. The combination, with a shaft upon which the chain is wound, of a large gear upon the shaft, a worm-gear arranged to engage the gear upon the said shaft, and pivoted bearing carrying the shaft to the worm-gear, and a swinging bail provided with eccentrics at its upper and lower ends, arranged to swing the said pivoted bearing so as to disengage the worm from the large gear, substantially as described.

3. The combination, with a stump-extractor, of the main shaft C, provided with large gear D, in combination with the worm-gears, the pivoted metal bar-plates for the shaft of said gears, the bails I, with the eccentrics upon their shafts, arranged to operate the said pivoted bearing-plates in order to engage or disengage the worm-wheels from the main large driving-gear upon the shaft to which the chains are attached, substantially as described.

In testimony that I claim the foregoing as my own I affix my signature in presence of two witnesses.

his
DANIEL × CORNELIUS.
mark.

Witnesses:
T. H. ALEXANDER,
WM. R. KEYWORTH.